3,466,365
ANTIVIRAL COMPOSITIONS AND
METHOD OF USE
Walter Schlesinger, Westfield, N.J., assignor to White
Laboratories, Inc., Kenilworth, N.J., a corporation of
New Jersey
No Drawing. Continuation-in-part of application Ser. No.
547,749, May 5, 1966, which is a continuation-in-part
of application Ser. No. 415,199, Dec. 1, 1964. This application July 24, 1967, Ser. No. 655,308
Int. Cl. A61k 27/00
U.S. Cl. 424—78   5 Claims

ABSTRACT OF THE DISCLOSURE

Described are formulations for topical and parenteral administration comprising as the essential active ingredient an alkali metal polyvinyl sulfate having an average molecular weight of from about 300 to about 500,000 and wherein the degree of sulfation is from about 25 to about 95 percent. Described as preferred alkali metal polyvinyl sulfates are sodium polyvinyl sulfate and potassium polyvinyl sulfate.

Also described is the use and method of using these formulations as antiviral agents. In particular are described the method of combatting herpes simplex viral infections by administration of sodium polyvinyl sulfate and the method of reducing $A_2$ influenza viral infections by administration of potassium polyvinyl sulfate.

---

Cross reference to related application

This application is a continuation-in-part of copending application U.S. Ser. No. 547,749 filed May 5, 1966 now abandoned, in turn a continuation-in-part of U.S. Ser. No. 415,199, filed Dec. 1, 1964, now abandoned.

Field of invention

This invention relates to compositions of matter useful in the application of antiviral therapy and to the method of combatting virus infections which comprises administering dosage units of such compositions to an infected or potentially infected mammalian host.

Summary of invention

The instant invention, in its composition aspect, may be described as residing in the concept of antiviral compositions wherein the essential active ingredient is an alkali metal polyvinyl sulfate, preferably sodium polyvinyl sulfate and potassium polyvinyl sulfate, having an average molecular weight of from about 300 to about 500,000 and wherein the degree of sulfation is from about 25 to about 95 percent.

In one of its process aspects, the instant invention may be described as residing in the concept of combatting viral infections and particularly herpes simplex infections, by administering to an infected host dosage units of an antiviral composition containing, as the essential active ingredient, an alkali metal polyvinyl sulfate or an equivalent thereof as disclosed hereinbelow, preferably sodium polyvinyl sulfate, having an average molecular weight of from about 300 to about 500,000 and wherein the degree of sulfation is from about 25 to about 95 percent.

In another of its process aspects, the instant invention may be described as residing in the concept of preventing or reducing the incidence of (i.e. resisting) viral infections in a host exposed to viral infection, such as, in particular, herpes simplex and $A_2$ influenza viral infection, by administering to such potential host dosage units of an antiviral composition containing, as the essential active ingredient, an alkali metal polyvinyl sulfate, or equivalent thereof, preferably sodium polyvinyl sulfate and potassium polyvinyl sulfate, having an average molecular weight of from about 300 to about 500,000 and wherein the degree of sulfation is from about 25 to about 95 percent.

In each of the foregoing process aspects, preferred antiviral agents are sodium polyvinyl sulfate and potassium polyvinyl sulfate.

As used in this specification and in the claims, the molecular weight of an alkali metal polyvinyl sulfate is a calculated molecular weight based upon the molecular weight of the starting polyvinyl alcohol and the percent sulfur in the alkali metal polyvinyl sulfate as determined by standard combustion analysis techniques, assuming no degradation occurred during sulfation.

Degree of sulfation as used herein is calculated from the analytically determined percent sulfur of the sodium salt as follows:

$$\text{Degree of sulfation} = \left(\frac{\text{percent sulfur found}}{21.95}\right) \times 100$$

21.95% being the theoretical sulfur content for the sodium salt repeating unit —$(CH_2CHOSO_3Na)_x$—.

Thus, for example, a sodium polyvinyl sulfate having a degree of sulfation of 84.3 percent (18.5% sulfur) which was derived from a polyvinyl alcohol of molecular weight 10,000, is defined as having a molecular weight of 29,528, which is calculated as follows (M.W.=molecular weight):

$$\frac{\text{M.W. of unsulfated polymer}}{\text{M.W. of repeating}} = \text{no. of repeating units}$$

$$\frac{10,000}{44.05} = 227 \text{ (no. of repeating units)}$$

Of these repeating units, 84.3% are sulfated in the final polymer; 15.7% are unsulfated.

227×.843×146.1 (M.W. of sulfated Na salt unit)=27,958 M.W. due to sulfated portion 227×.157×44.05 (M.W. of unsulfated unit)=1,570 M.W. due to unsulfated portion 27,958+1,570=29,528 M.W. (calc.) of polymer The molecular weights of the starting polyvinyl alcohols from whence are derived, via known procedures, the alkali metal polyvinyl sulfate antiviral agents of this invention may be determined via techniques such as osmometry, viscosity, light scattering.

Brief description of the invention

The instant invention is based upon the discovery that the alkali metal polyvinyl sulfate compositions, and particularly sodium polyvinyl sulfate and potassium polyvinyl sulfate compositions described above display significant antiviral activity and may be employed in resisting as well as combatting viral infections in animals including, for purpose of illustration but without limiting the generality of the foregoing, influenza, parainfluenza and herpes simplex infections. Antiviral activity has been demonstrated by standard in vitro and in vivo techniques including tissue culture, rabbit eye assays, and mouse protection tests. It is contemplated that the compositions of this invention will be particularly useful in resisting as well as combatting herpes simplex infections, and also useful in resisting influenza infections in domestic animals and in household pets such as cattle, horses, dogs and cats. Alkali metal polyvinyl sulfates, such as sodium polyvinyl sulfate and potassium polyvinyl sulfate and equivalents thereof as described herein are well-known, and are either available commercially or may be readily prepared by the sulfation of polyvinyl alcohol and preparation of alkali metal salts of the resulting polyvinyl sulfate employing methods conventional in the art.

The antiviral activity of sodium polyvinyl sulfate against herpes simplex was measured by well recognized tests. In one type of in vitro test, chick fibroblast tissue culture assays determined the protective effect of alkali metal polyvinyl sulfates such as potassium polyvinyl sulfate, ammonium polyvinyl sulfate, and particularly sodium polyvinyl sulfate against a herpes simplex inoculum giving confluent lesions on chick fibroblast monolayers.

In another type assay (in vivo), herpes simplex lesions were produced in the eyes of albino rabbits under standard conditions followed by six treatments with sodium polyvinyl sulfate ointment. The response to the medication was noted and photographs taken as a permanent record of the response to the medication.

In both the foregoing tests, alkali metal polyvinyl sulfates, particularly sodium polyvinyl sulfate, show marked activity both in vitro and in vivo against herpes simplex.

The antiviral activity of alkali metal polyvinyl sulfate, particularly sodium and potassium polyvinyl sulfate against $A_2$ influenza virus was measured by the well-recognized in vitro method of Herrmann in chick fibroblast tissue culture, and the antiviral activity of potassium polyvinyl sulfate was demonstrated in vivo in the mouse protection test. In the latter test, three prophylactic doses of 1.25 mgm., 2.5 mgm., and 3.75 mgm., respectively, of potassium polyvinyl sulfate contained in 0.5 ml. water were administered subcutaneously prior to exposing the mouse (23 gm. weight) to a lethal dose of $A_2$ influenza virus via aerosol spray. The survival of the drug-treated, infected mice was observed over a fourteen day experimental period.

In the foregoing tests, alkali metal polyvinyl sulfates, particularly potassium polyvinyl sulfate, exhibited antiviral activity against $A_2$ influenza. Potassium polyvinyl sulfate, in particular, demonstrated protective antiviral activity against $A_2$ influenza virus.

The compositions of this invention are effective in resisting as well as combatting herpes simplex viral infections when administered topically to the site of the infection or potential infection in the form of ointments, salves, lotions, creams, sprays, drops, etc. In the case of such viral infections, as, for example, influenza and parainfluenza, and, in particular, $A_2$ influenza, the compositions of this invention are advantageously administered parenterally, e.g. subcutaneously, or in the form of nasal and oral aerosol spray. These compositions (e.g. both topical and parenteral) are usually formulated so as to contain from 0.01 to 10 percent by weight of sodium polyvinyl sulfate, potassium polyvinyl sulfate or equivalent thereof.

In addition, the compositions of this invention may be formulated so as to contain anti-inflammatory corticoid and/or antibiotic agents. Further they may be cojointly administered with a viral inhibitor such as interferon.

The dosage administered will be dependent on the viral disease being treated, the age, health, and weight of the recipient, kind of concomitant treatment, if any, and frequency and route of treatment.

Effective antiviral response against herpes simplex virus usually requires from 1 to 40 applications of the compositions of this invention directly to the infected area, said compositions usually having from about 0.1 to 10% sodium polyvinyl sulfate. Depending on the severity of the infection, when utilizing an ointment, usually from 1 to 6 topical applications may be applied daily. It will be understood, of course, that these dosages are merely the usual dosages and may be varied according to the severity of the infection under treatment.

Effective prophylactic antiviral response against $A_2$ influenza usually requires from about 1–250 mgm. alkali metal polyvinyl sulfate, e.g. potassium polyvinyl sulfate, per kilogram body weight administered parenterally in from 1 to 10 doses or more over a period of from about one to eight or more days prior to exposure to $A_2$ influenza virus.

The following examples illustrate typical antiviral formulations of this invention.

FORMULATIONS FOR TREATMENT OF AND PREVENTION OF HERPES SIMPLEX

Ointment formulation (10%)

Formula: Parts by weight

Premix A—
- Light mineral oil _____ 45.0
- Beeswax _____ 8.0
- Arlacel 83 (sorbitan sesquileate) Atlas Chemical Company, Wilmington, Del. __ 1.0
- Lanolin _____ 3.0
- Propyl paraben _____ 0.15

Premix B—
- Water _____ 32.7
- Sodium polyvinyl sulfate _____ 10.0
- Methyl paraben _____ 0.15

Mix the components of Premix A until homogeneous, warming slightly, if desired, to facilitate solution. To prepare Premix B, dissolve the sodium polyvinyl sulfate and methyl paraben in the water without heating. Slowly, and with stirring, pour Premix A into Premix B to form a creamy smooth emulsion. Pass through a colloid mill, if desired.

Ointment formulation (5%) with hydrocortisone

Formula: Parts by weight

Premix A—
- Light mineral oil _____ 45.0
- Beeswax _____ 8.0
- Lanolin _____ 3.0
- Arlacel 83 _____ 1.0
- Hydrocortisone _____ 1.0
- Propyl paraben _____ 0.15

Premix B—
- Water _____ 36.7
- Sodium polyvinyl sulfate _____ 5.0
- Methyl paraben _____ 0.15

Prepare Premix A by dissolving the beeswax, lanolin, Arlacel 83 and propyl paraben in the mineral oil. Warm slightly, if desired, to facilitate solution. With stirring, add the finely powdered hydrocortisone without further heat. Prepare Premix B by dissolving the sodium polyvinyl sulfate and methyl paraben in the water without heat. Slowly, and with stirring, pour Premix A into Premix B to form a smooth creamy emulsion. Pass through a colloid mill, if desired.

Water soluble ointment formulation (5%)

Formula: Parts by weight
- Polyethylene glycol 4000 _____ 33
- Polyethylene glycol 400 _____ 60
- Water _____ 2
- Sodium polyvinyl sulfate _____ 5

Dissolve the polyethylene glycol 4000 in the polyethylene 400, warming slightly. Make a fine paste of the sodium polyvinyl sulfate with the water. Add without additional heat the mixed polyglycols, stirring constantly to produce a smooth cream.

Sterile aqueous drops (10%)

Formula: Parts by weight
- Sodium polyvinyl sulfate _____ 10
- Distilled water _____ 90

Dissolve the sodium polyvinyl sulfate with stirring in the water. Centrifuge to remove polymer which is dispersed rather than dissolved. Filter through a fine filter pad; then through a sterilizing filter. Subdivide aseptically into sterile containers of desired size.

Aerosol spray formulation (5%)

Formula: Parts by weight
- Water ........................ 84
- Sodium polyvinyl sulfate ...... 5
- Propylene glycol .............. 4
- Propellants 12/114 (57/43) .... 7

(Dichlorodifluoromethane/dichlorotetrafluoroethane)

Dissolve the sodium polyvinyl sulfate in water. Slowly, and with stirring, add the propylene glycol. Package in suitable aerosol container with the 12/114 propellant mixture. Shake product before dispensing.

Aerosol foam formulation (5%)

Formula: Parts by weight
- Sodium polyvinyl sulfate ...... 5.0
- Water ........................ 66.5
- Stearic acid .................. 4.0
- Coconut oil fatty acids ....... 1.5
- Glyceryl monostearate ......... 2.0
- Glycerin ...................... 10.0
- Triethanolamine ............... 4.0
- Propellant 12/114 (57/43) ..... 7.0

Melt together, with minimum heating, the stearic acid, coconut oil fatty acids and glyceryl monostearate. Dissolve the sodium polyvinyl sulfate in the water without heat and add the glycerine and triethanolamine, stirring until homogenous. Add the fatty acid-monoglyceride mixture and stir well. Package in appropriate aerosol containers with the 12/114 propellant. Shake product before dispensing.

FORMULATIONS FOR PREVENTION OF $A_2$ INFLUENZA VIRAL INFECTIONS

Parenteral formulation—(subcutaneous or intramuscular injection)

Formula: Per 1000 ml.
- Potassium polyvinyl sulfate ............ gm  5.0
- Water (for injection), q.s. to 1000 ml.

Using aseptic techniques dissolve the polymer in approximately half the total quantity of water. Pass through a membrane-type sterilizing filter and collect (using aseptic techniques) in a suitable sterile vessel. Dilute to volume with sterile water.

Subdivide aseptically into vials or ampules of the desired size.

Spray formulation (for inhalation)

| Formula: | Parts by weight |
|---|---|
| Ammonium polyvinyl sulfate | 1.0 |
| Sterile water | 99.0 |

Dissolve the polymer in the sterile water, and, using aseptic techniques, filter through a membrane-type sterilizing filter. Collect in a suitable sterile vessel.

Subdivide as desired into sterile spray bottles. Alternatively the product may be packaged sterilely into pressurized aerosol containers, using visual techniques.

Spray formulation

| Formula: | Parts by weight |
|---|---|
| Sodium polyvinyl sulfate | 1.0 |
| Sodium lauryl sulfate, U.S.P. (Duponol C) (E. I. du Pont de Nemours and Co.) | 0.25 |
| Sterile water, q.s. ad 100. | |

Dissolve the polymer in approximately half the total quantity of water and the sodium lauryl sulfate, separately in another one-third of the total quantity of water. Mix the two solutions. Add the remainder of the water and sterile filter, using aseptic techniques. Collect in a sterile vessel.

Subdivide into convenient sterile spray-type containers or pressurized aerosol containers.

Although the preceding disclosure has related specifically to antiviral compositions containing as the essential active ingredient, alkali metal polyvinyl sulfates such as sodium or potassium polyvinyl sulfate having an average molecular weight of about from 300 to 500,000 and wherein the degree of sulfation is from about 25 to 95 percent, many modifications in the disclosed compositions will suggest themselves to those skilled in the art. It will be apparent that the molecular weight and the degree of sulfation of the alkali metal polyvinyl sulfate may vary substantially from the values recited. Thus, for example, the molecular weight may fall within the range from about 300 to about 5,000,000 and the degree of sulfation may vary from about 10 to about 100 percent.

It will also be apparent that the unsulfated portion of the molecule may contain groups other than hydroxyl. Active polymers, for example, may be made by sulfation of only partially hydrolyzed polyvinyl acylates, e.g. acetates, or, alternatively, by sulfation of ether, acetal or other derivatives of polyvinyl alcohol of low degree of substitution. The polymers, therefore, may be mixed polyvinyl sulfate-alcohol-acylate, polyvinyl sulfate-alcohol-ether, polyvinyl sulfate-alcohol-acetal or other modification.

Further, it will be obvious that alkali metal salts other than the sodium and potassium salts, and salts other than alkali metal salts may be employed. Thus, for example, lithium polyvinyl sulfate, rubidium polyvinyl sulfate, cesium polyvinyl sulfate or magnesium polyvinyl sulfate may be substituted for sodium polyvinyl sulfate. Finally, since the free acids or partially neutralized salts are physiologically equivalent to the fully neutralized salt, these may also be used. Applicant considers all such modifications disclosed hereinabove to be the full equivalent of the sodium polyvinyl sulfate disclosed and to fall within the scope of this invention.

The instant invention resides in the concept of antiviral compositions containing, as the essential active ingredient from about 0.01 to about 10 percent by weight of a sodium polyvinyl sulfate having an average molecular weight of about 300 to 500,000 and wherein the degree of sulfation is about 25 to 100 percent and in the concept of employing such compositions in resisting as well as combatting viral infections. It is contemplated that ointments, salves, lotions, sprays, drops, aerosols, etc. containing the above concentration of active ingredient will be applied daily in an amount sufficient to achieve an antiviral response for herpes simplex, for example. It is also contemplated that there will be administered daily a dose of potassium polyvinyl sulfate sufficient to reduce $A_2$ influenza infection by means of treatment with a parenteral composition suitable for administration including as carriers a sterile liquid such as water and oils (e.g. peanout oil, soybean oil, mineral oil, sesame oil). In general, water, saline, aqueous, dextrose (glucose) and related sugar solutions are preferred liquid carriers for injectible solutions.

The nature of the vehicle employed is not an essential part of the invention. Various modifications in the formulations specifically illustrated will be obvious to those skilled in the art and applicant considers all such modifications to fall within the scope of this invention.

The subject matter which applicant regards as his invention is particularly pointed out and distinctly claimed as follows:

1. A method of treating viral infections selected from the group consisting of herpes simplex and $A_2$ influenza viral infections in an animal host subject to said infections which comprises administering a therapeutically effective quantity of a pharmaceutical formulation comprising as the essential active ingredient an alkali metal polyvinyl sulfate selected from the group consisting of sodium polyvinyl sulfate and potassium polyvinyl sulfate, said alkali metal polyvinyl sulfate having an average molecular weight of from about 300 to about 500,000 and wherein the degree of sulfation is from about 25 to about 95%.

2. A method of claim 1 wherein said viral infection is a herpes simplex viral infection and said alkali metal polyvinyl sulfate is sodium polyvinyl sulfate, said method being a method for resisting as well as combatting herpes simplex infections in an animal host subject to herpes simplex infection which comprises topical application of a therapeutically effective quantity of a pharmaceutical formulation comprising as the essential active ingredient sodium polyvinyl sulfate.

3. The method of claim 2 wherein the sodium polyvinyl sulfate comprises from about 0.1 to about 10 percent by weight of the pharmaceutical formulation.

4. A method of claim 1 wherein said viral infection is an $A_2$ influenza viral infection and said alkali metal polyvinyl sulfate is potassium polyvinyl sulfate, said method being a method for resisting $A_2$ influenza viral infections in an animal host subject to $A_2$ influenza infection which comprises parenteral administration of a therapeutically effective quantity of a pharmaceutical formulation comprising as the essential active ingredient potassium polyvinyl sulfate.

5. The method of claim 4 wherein the potassium polyvinyl sulfate comprises from about 0.1 to about 10 percent by weight of the pharmaceutical formulation.

References Cited

UNITED STATES PATENTS 2,781,290   2/1957   Martin et al. _____ 424—79

ALBERT T. MEYERS, Primary Examiner

J. GOLDBERG, Assistant Examiner

U.S. Cl. X.R.

424—315

PO-1050
(5/69)

UNITED STATES PATENT OFFICE
CERTIFICATE OF CORRECTION

Patent No. 3,466,365        Dated September 9, 1969

Inventor(s) Walter Schlesinger

It is certified that error appears in the above-identified patent and that said Letters Patent are hereby corrected as shown below:

In column 2, line 30, the left portion of the equation reading

"$\frac{\text{M.W. of unsulfated polymer}}{\text{M.W. of repeating}}$" should read -- $\frac{\text{M.W. of unsulfated po}}{\text{M.W. of repeating uni}}$ Column 6, line 54, "peanout oil" should read ---peanut oil---

SIGNED AND
SEALED
DEC 30 1969

(SEAL)
Attest:

Edward M. Fletcher, Jr.
Attesting Officer

WILLIAM E. SCHUYLER,
Commissioner of Patent